United States Patent [19]
Kimura

[11] Patent Number: 6,014,220
[45] Date of Patent: Jan. 11, 2000

[54] AUTOMATIC CONTROL SYSTEM FOR CONSTRUCTION MACHINERY

[75] Inventor: Kazuaki Kimura, Tokyo, Japan

[73] Assignee: Kabushiki Kaisha Topcon, Tokyo, Japan

[21] Appl. No.: 08/967,145

[22] Filed: Nov. 10, 1997

[51] Int. Cl.$^7$ .................................................. G01B 11/00
[52] U.S. Cl. ............................................................ 356/400
[58] Field of Search ................................. 356/399–401, 356/139.02, 3.12; 364/424.07; 172/4.5, 2, 10.2 D; 56/10.2 F, 10.2 E; 701/50

[56] References Cited

U.S. PATENT DOCUMENTS 5,440,112  8/1995  Sakimura et al. .
5,771,978  6/1998  Davidson et al. .
5,798,828  8/1998  Thomas et al. .

Primary Examiner—K. P. Hantis
Attorney, Agent, or Firm—Limbach & Limbach, LLP

[57] ABSTRACT

An automatic control system comprises a construction machine provided on a construction site and equipped with a ground leveling implement and a target; a survey unit for projecting a beam of tracking light toward the target and receiving reflected tracking light from the target to determine a coordinate position of the target; a storage unit for storing finished-plane height data corresponding to coordinate positions; a computation unit for determining a finished target height at the coordinate position of the target and for computing a deviation between the finished target height and a measured target height; and a transmitter for transmitting the deviation toward the construction site. The survey unit operates in a finished-height data drive mode in which the tracking light is moved vertically so that the height of the tracking light at the horizontal coordinate position is at the finished target height. The construction machine has a receiver for receiving the deviation and a height control unit for controlling a height of the ground leveling implement according to the received deviation data.

13 Claims, 11 Drawing Sheets

AUTOMATIC CONTROL SYSTEM FOR CONSTRUCTION MACHINERY

BACKGROUND OF THE INVENTION

1. Field of the Invention

The present invention relates to an improvement in an automatic control system for construction machines which automatically perform leveling of ground and paving. The construction machines are used in the civil engineering and construction field and include, for example, motor graders, pavers, and bulldozers.

2. Description of the Related At

In the civil engineering and construction field, the ground leveling implements of a construction machine, such as a blade and a screed, are automatically controlled in performing ground leveling and paving.

In the system for automatically controlling a ground leveling implement that is used in a construction machine, a ground leveling string corresponding to a finished cross section is stretched over the construction site in order to obtain an expected fished surface. The interval between the ground leveling string and the ground leveling implement is detected with a contact type cantilever or a non-contact type ultrasonic sensor. Based on the detection result, the ground leveling implement is controlled so as to follow the ground leveling string. However, the system for automatically controlling a ground leveling implement so that the implement follows a ground leveling string requires a great deal of labor to stretch a ground leveling string over a construction site.

Hence, there has been proposed an automatic control system for construction machinery which is capable of automatically controlling a ground leveling implement and obtaining an expected finished surface without stretching a ground leveling string over a construction site.

An example of the aforementioned automatic control system is shown in FIG. 1. In the figure, reference numeral 1 denotes a bulldozer which is a construction machine for leveling a construction site, 2 a rotating laser unit installed in a construction site, 3 a blade which is a ground leveling implement, 4 a pole attached to the blade 3, and 5 a laser sensor fixed to the pole 4.

The rotating laser unit 2 forms a reference plane Rs at a position of a predetermined height (h) away from a finished plane 6 by means of a generated laser beam. The blade 3 is controlled so that the laser light from the rotating laser unit 2 strikes against the vertical center Ho of the laser sensor 5 (center Ho in the height direction of the laser sensor 5), by an oil pressure control unit 7 serving as ground leveling implement control means. In this way, the ground of a construction side is leveled to an expected finished plane 6. According to this automatic control system for construction machines, a ground leveling operation and a paving operation can be simply performed compared with an operation of stretching a ground leveling string over a construction site.

However, in the case where the ground 6' and finished plane 6 of a construction site have a complicated configuration with undulations and inclination, the rotating laser unit 2 has to be reinstalled as shown in FIG. 2 in order to obtain the reference plane Rs. For this reason, in the case of the leveling and paving of complicated ground contours reinstalling the rotating laser unit 2 will be troublesome.

Hence, another system for automatically controlling the construction machine 1 has been proposed. This system employs an automatic tracking type survey unit (also called a total tracking station), which is available as "AP-L1" manufactured by TOPCON. The automatic tracking type survey unit measures a distance to a target, a horizontal angle between a reference direction and a direction in which the target exists, and a vertical angle between a reference height and a direction in which the target exists, and tracks the target.

FIG. 3 illustrates an example of the system for automatically controlling a construction machine by employing an automatic tracking type survey unit. In the figure, reference numeral 8 denotes an automatic tracking type survey unit, which is installed at the known coordinate point O of a construction block. The survey unit 8 is connected to a personal computer (PC) 9, which is in turn connected to a radio transmitter 10. A bulldozer 1 is provided with a blade 3, a pole 4 attached to the blade 3, an oil pressure control unit 7, a prism 11 attached to the pole 4 as a target to be tracked, and a radio receiver 12.

The PC 9 stores finished-height data that defines the desired elevation of the finished ground surface at each coordinate position. The height of the finished surface is usually expressed by an elevation or height relative to a known reference such as sea level. The survey unit 8 tracks the prism 11 with a tracking light L and measures the distance from the known coordinate position O to the prism 11 and the horizontal angle between a reference direction and a direction in which the prism 11 exists. Based on the measured distance and horizontal angle, the survey unit 8 computes at least the horizontal coordinate position of the prism 11 (target) relative to the known coordinate O. The computed horizontal coordinate position data is transferred from the survey unit 8 to the PC 9.

The PC 9 calls out finished-height data corresponding to the computed horizontal coordinate position. Then, the PC 9 transfers the finished-height data to the radio transmitter 10. The radio transmitter 10 transmits the finished-height data to the radio receiver 12. The oil pressure control unit 7 controls the blade 3, based on the finished-height data received by the radio receiver 12. The blade 3 digs or cuts ground so that the ground has a designed fished height.

The system for automatically controlling a construction machine with the automatic tracking type survey unit 8 has an advantage that a complicated finished ground surface can be created without increasing the number of steps, because the blade 3 is controlled based on the finished-height data.

Incidentally, the conventional automatic total tracking station 8 is constituted so that it tracks a target in both a horizontal direction and a vertical direction. The automatic total tracking station 8 detects the target position of the target, such as prism 11, through a telescope and feeds back the offset quantity i.e., offset between the target position and the optical axis center of the barrel portion of the telescope to a horizontal-vertical drive servo motor. In this way, the automatic total tracking station 8 is controlled so that the optical axis center tracks the target. However, there is a limit to the response time, and in the case where the vibration cycle of the target is fast, the station 8 cannot follow it and a dead zone will occur. Also, in the conventional tracking control system, the height of the ground leveling implement 3 is controlled based on finished height data, and if the height of the ground leveling implement 3 changes, the tracking light follows this change. Because the tracking light follows the change, there are cases where the tracking station 8 will give rise to a hunting phenomenon. Therefore, when the construction machine 1 travels on a desert road surface, there is the possibility that the vertical vibration, will cause an error in the position detection.

In addition, since the ground leveling implement 3 itself of the construction machine 1 has a specific response speed and is automatically controlled, control is repeated between the construction machine 1 and total tracking station 8. This repetitive control causes a degradation in finished-height precision. Generally, in the case of the construction machine 1 which performs leveling of ground and paving, vertical (height-direction) finishing precision is required. This requirement hinders the use of the automatic total tracking station 8.

Another automatic control system has been proposed in U.S. patent application Ser. No. 08/658655 (filed on Jun. 5, 1996) now U.S. Pat. No. 5,771,978. The automatic total tracking station 8 tracks a target only in a horizontal direction and does not track it in a vertical direction. In this automatic control system, the total tracking station 8 is provided with a fan laser having a horizontal rotation or spread, and the horizontal coordinate position of a target is detected by horizontal tracking. The finished height data at the detected horizontal coordinate position is read out of storage, and the tracking station projects the fan beam to the designed height (finished height) at the detected horizontal coordinate position. The construction machine 1 is provided with a laser sensor, and this sensor detects the fan beam. Based on the difference between the vertical (height-direction) center of the laser sensor and the vertical position at which the fan beam was radiated on the laser sensor, the ground leveling implement is controlled so that the fan beam radiates the center of the laser sensor.

According to the aforementioned structure, one can obtain a finished height with a high degree of accuracy without being influenced by the vibration of the construction machine 1, because vertical tracking is based on finished height data, not the vertical position of a moving target. Also, vertical direction control of the ground leveling implement 3 of the construction machine 1 occurs only if the fan laser light is controlled so that it can be received at the vertical center of the laser sensor, and there is the advantage that control equal to or greater than the conventional control based on a rotating laser can be easily achieved.

However, in the aforementioned control system, for controlling the ground leveling implement 3 of the construction machine 1, an additional fan laser light source must be provided and, therefore, there is a disadvantage that the survey unit 8 becomes complicated structurally. Furthermore, in order to give construction information, such as the inclination of the ground leveling implement 3, to the operator of the construction machine 1, additional communication means for communicating the construction information is required, as with the control system employed in the conventional automatic total tracking station.

SUMMARY OF THE INVENTION

It is an object of the present invention to provide an automatic control system for a construction machine which is cable of performing automatic construction of high precision height by improving the operation of the aforementioned conventional automatic total tracking station, without providing an additional light emitting source such as a fan laser light source in a survey unit.

To achieve this end, there is provided an automatic control system comprising: a construction machine provided on a construction site and equipped with a ground leveling implement and a light reflecting target; a survey unit placed at a known point for radiating a beam at light toward a center of the target and receiving light reflected from the target to determine a coordinate position of the construction machine and a measured target height; storage means for storing finished-plane height data corresponding to coordinate positions; computation means for determining a finished target height (height of the target when the implement is at the finished height) and for computing a deviation between the finished target height and the measured target height; and transmission means for transmitting the deviation to the construction machine. In the automatic control system, the survey unit can operate in a finished-height data drive mode in which the tracking light is moved vertically so that the height of the tracking light at the horizontal coordinate position is at the finished target height, and the construction machine is provided with reception means for receiving the deviation and height control means for controlling a height of the ground leveling implement so that it becomes the finished-plane height, based on the deviation received by the reception means.

The transmission means may modulate the tracking light to transmit the deviation data to the reception means.

The transmission means and the reception means may be constituted by a radio communication unit.

The survey unit may have an automatic vertical tracking mode in which the rotation means is controlled so that an optical axis center of a lens-barrel portion provided in the survey unit coincides with a vertical center of the target. When the deviation is outside a predetermined range, the survey unit is switched from the finished-height data drive mode to the automatic vertical tracking mode.

Preferably, the target is provided integrally in the ground leveling implement, and the ground leveling implement and the target is controlled by the height control means.

Preferably, when data on the coordinate position of the target is input from the survey unit to the computation means, the computation means controls a rotation means, in the survey unit to move the light beam to the desired height at the measured coordinate position.

The deviation data may be employed as construction evaluation information.

The survey unit includes means for measuring a distance from the installed position thereof to the target.

BRIEF DESCRIPTION OF THE DRAWINGS

The present invention will be described in further detail with reference to the accompanying drawings wherein.

DETAILED DESCRIPTION OF THE PREFERRED EMBODIMENTS

Figure 4:
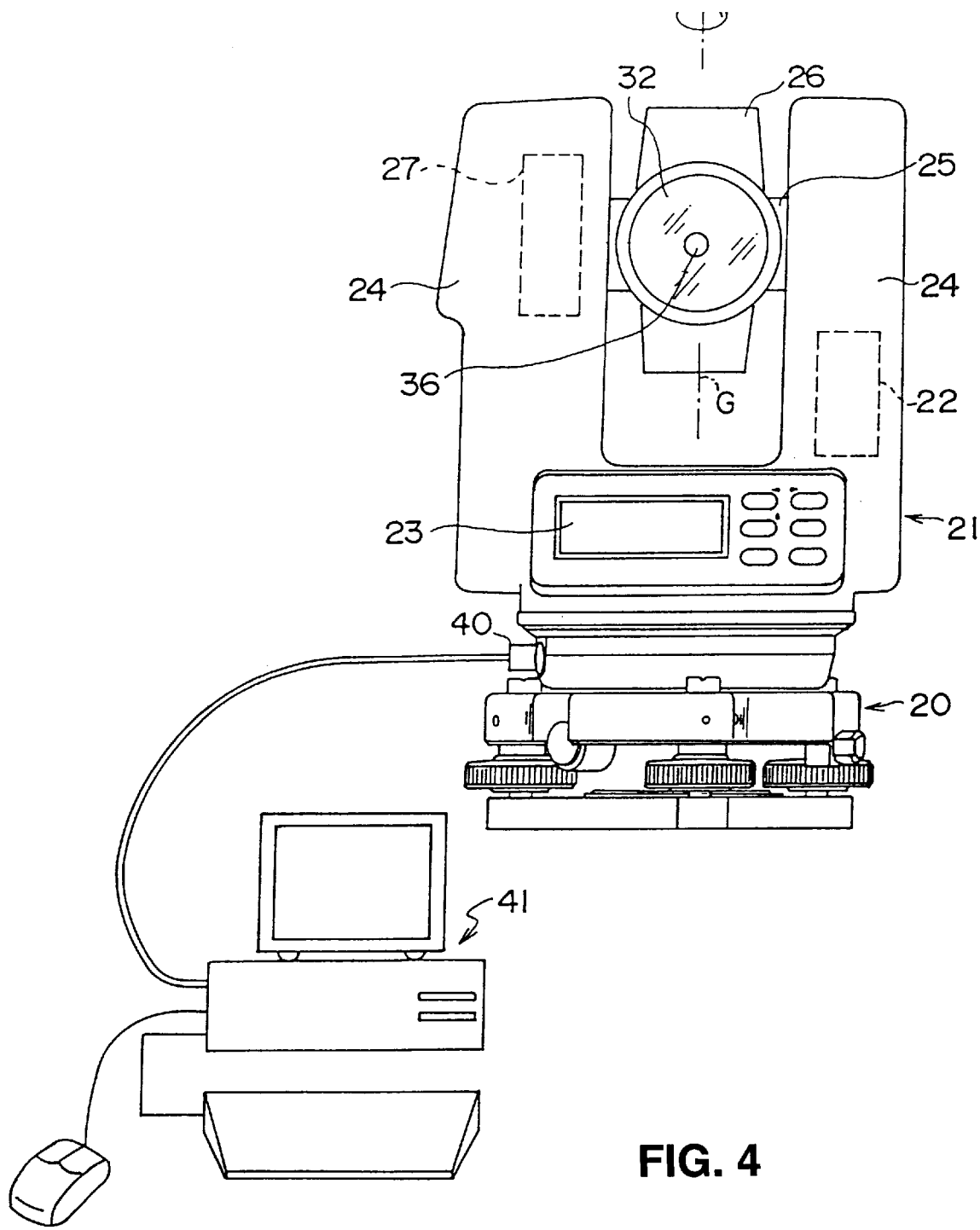
FIG. 4 is a schematic diagram showing an automatic tracking type survey unit according to an embodiment of the present invention.

Referring to FIG. 4, there is shown a total tracking station according to an embodiment of the present invention. In the figure, reference numeral 20 denotes a base portion and 21 a main body portion. The main body portion 21 is horizontally rotated (i.e., rotated in a horizontal plane) on a vertical axis G by horizontal rotation means 22. The main body portion 21 has a display portion 23 and a pair of support portions 24. The support portions 24 are connected together by a horizontal shaft 25. The horizontal shaft 25 is provided with a lens barrel portion 26, which is in turn vertically rotated (i.e., rotated in a vertical plane) on the horizontal shaft 25 by vertical rotation means 27. The quantity of horizontal rotation of the main body portion 21 and the quantity of vertical rotation of the lens barrel portion 26 are detected by a rotary encoder (not shown).

Figure 5:
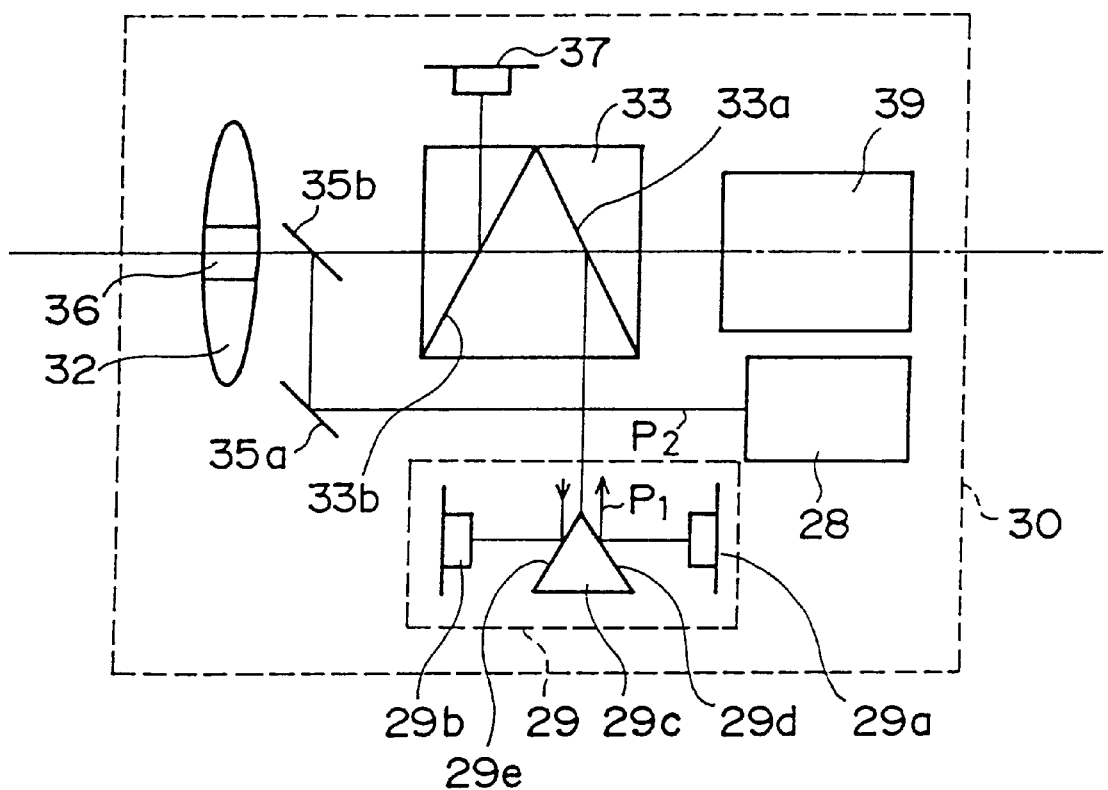
FIG. 5 is a block diagram showing the interior structure of a lens barrel portion shown in FIG. 4.

The lens barrel portion 26 includes a tracking and measuring unit portion 30, as shown in FIG. 5. The tracking and measuring unit portion 30 comprises a horizontal tracking-light generating portion 28 and a light wave distance meter (EDM) portion 29 which measures a distance to a target (prism).

The tracking and measuring unit portion 30 has an objective lens 32 which is shared by a tracking operation and a distance measuring operation. The EDM portion 29 is constituted by a first light emitting element 29a, a second light emitting element 29b, and a split mirror 29c. The distance measuring light P1, emitted from the first light emitting element 29a and modulated with a specific frequency, is reflected by the reflecting surface 29d of the split mirror 29c and the reflecting surface 33a of A dichroic mirror 33. The reflected light P1 is passed through the lower half of the objective lens 32 and is guided to a prism 34 (see FIG. 6) which is a target. The modulated light, reflected by the prism 34, is condensed by the upper half of the objective lens 32 and is reflected by the reflecting surface 38a of the dichroic mirror 33. The light reflected by the dichroic mirror 33 is reflected by the reflecting surface 29e of the split prism 29c and is guided to the second light emitting element 29b.

The EDM portion 29 is equipped with a processing circuit (not shown). The processing circuit measures the phase difference between an emitted-light signal modulated with a specific frequency and a received-light signal, and measures the distance to the prism 34, from the measured phase difference. The dichroic mirror 33 is equipped with a second reflecting surface 33b, which in turn transmits the distance measuring light P1 emitted from the first light emitting element 29a and reflects tracking light P2 to be described later.

Figure 1:
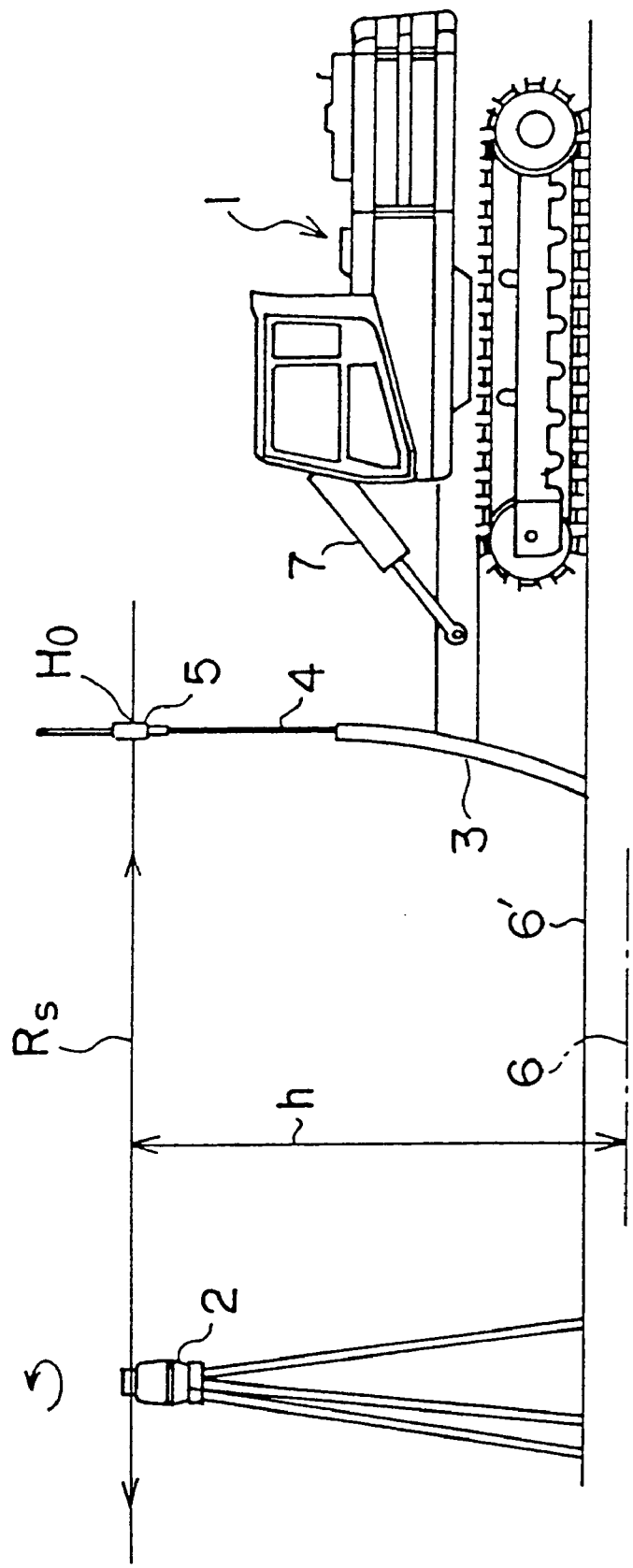
FIG. 1 is a side view showing a conventional automatic control system for a construction machine which employs a rotating laser unit.
Figure 2:
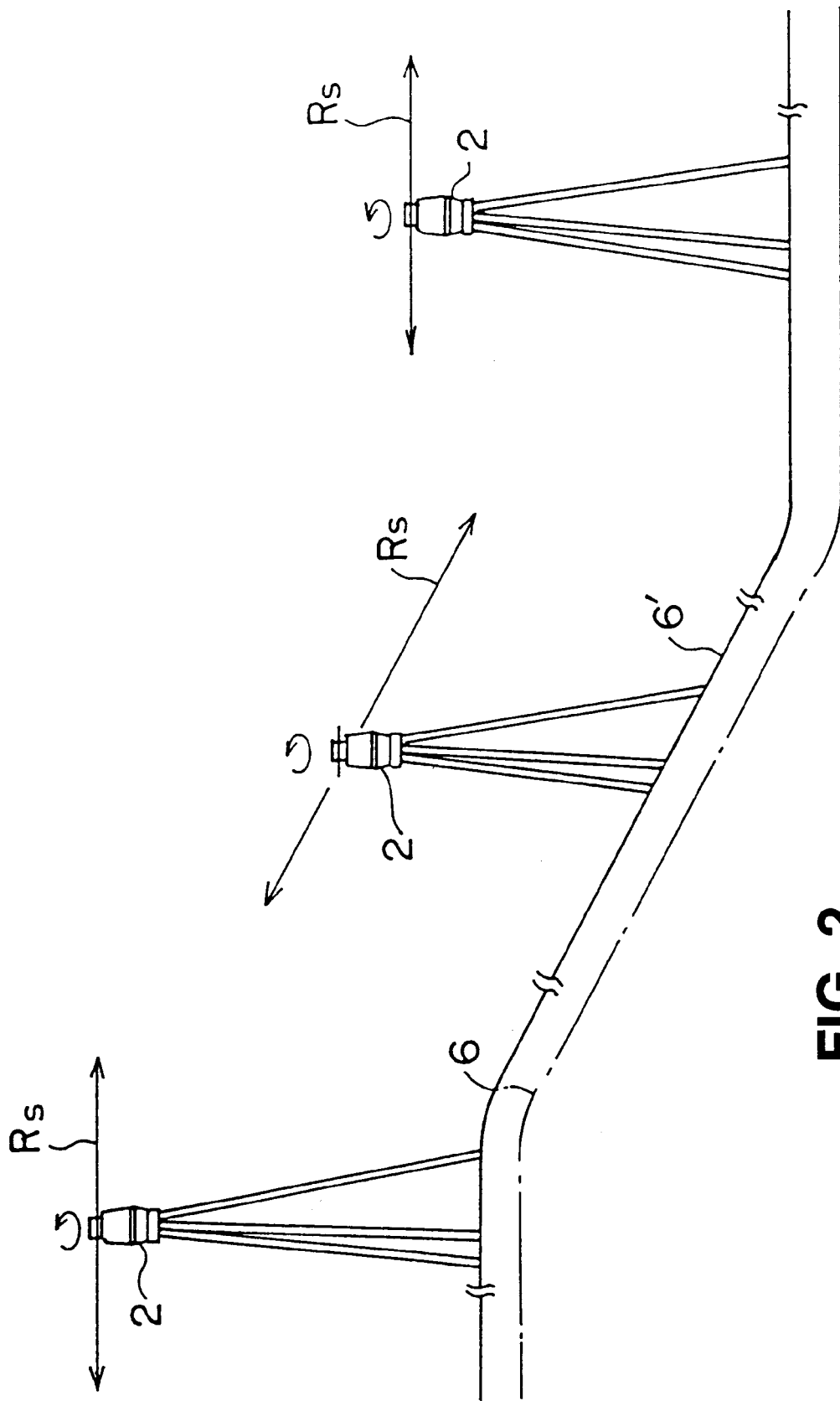
FIG. 2 is a side view used to explain the disadvantages of the conventional automatic control system shown in FIG. 1.
Figure 3:
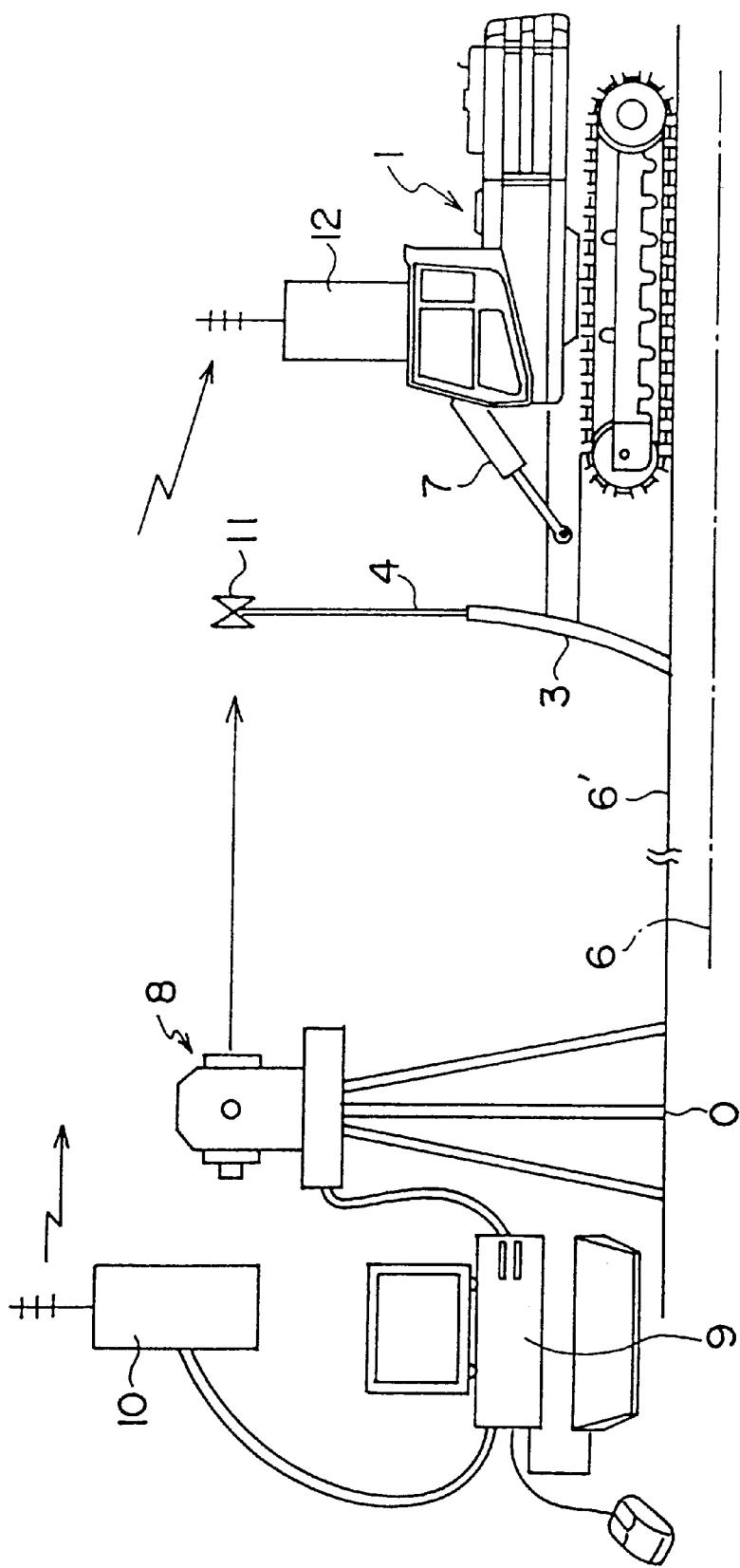
FIG. 3 is a side view showing another conventional automatic control system for a construction machine which employs an automatic tracking type survey unit.
Figure 7:
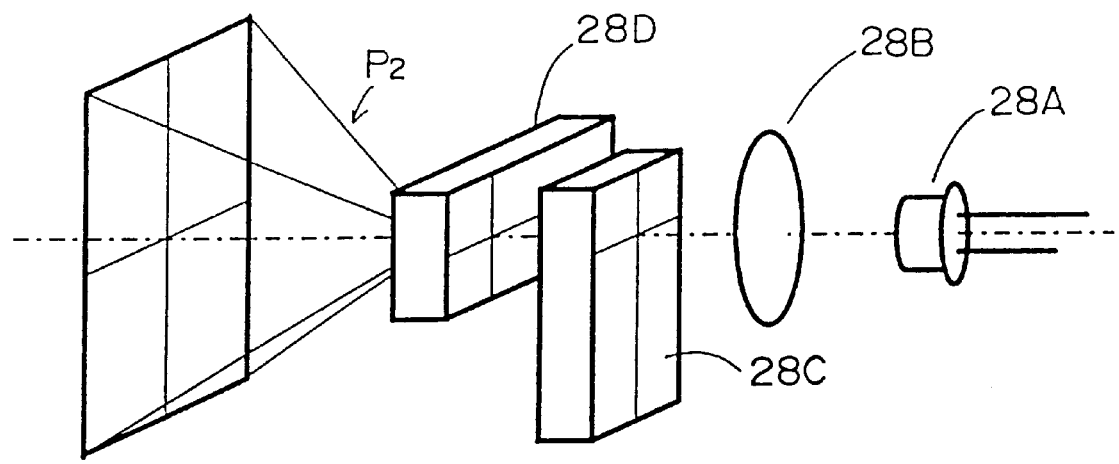
FIG. 7 is a perspective view showing a tracking portion shown in FIG. 5.

The tracking-light generating portion 28 has a two-dimensional scanning portion for moving a laser light beam P2 in a two-dimensional direction of X-Z. The two-dimensional scanning portion, as shown in FIG. 7, is constituted by a laser diode 28A, a collimator lens 28B for converting laser light (tracking light P2) emitted from the laser diode 28A to a collimated beam of light, and acoustic-optic elements 28C and 28D crossing each other at right angles. Since the two-dimensional scanning portion is well known in the prior art, an illustration thereof is omitted. For the illustration of the scanning portion, see FIG. 3 of Japan Laid-Open Patent Publication No. HEI 5-322569. Note that the scanning operation may also be performed by a combination of a rotational polygon mirror and a galvanometer mirror.

The scanning beam (tracking light) P2 emitted from the two-dimensional scanning portion is reflected by a first mirror 35a and a second mirror 35b. The reflected light is passed through a center hole 36 of the objective lens 32 and is directed toward the prism 34. The tracking laser light P2 reflected by the prism 34 is focused by the entire surface of the objective lens 32, is reflected by the reflecting surface 33b of the dichroic mirror 33, and is focused on a light receiving element 37. The wavelength of the tracking light P2 is different from that of the distance measuring light P1 emitted from the light emitting element 29a.

Figure 8:
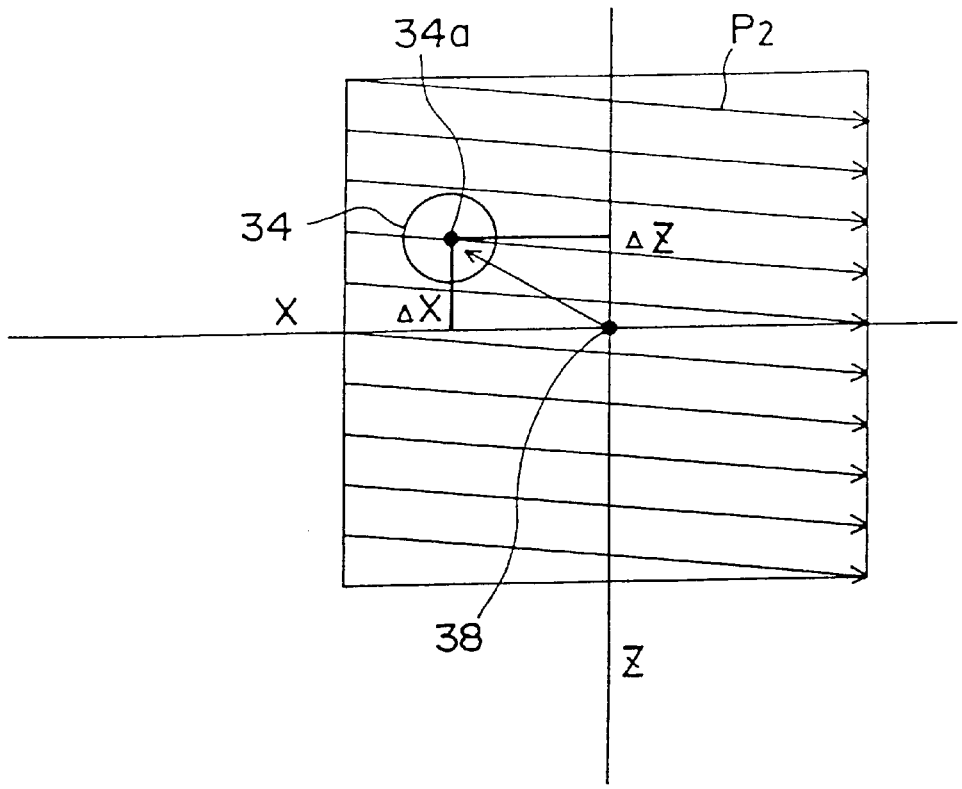
FIG. 8 is an explanatory diagram showing how a two-dimensional scanning operation is performed.

The position detection of the prism 34 is performed as follows:

As shown in FIG. 8, a predetermined area is scanned in a raster fashion in an X-Z direction by the scanning light P2 emitted from the two-dimensional scanning portion of the tracking portion 28. When the scanning light P2 strikes against the prism 34, it is reflected. The reflected light (tracking light) P2, as described above, is focused by the objective lens 32 and returns to the light receiving element 37. A processing circuit (not shown) detects the timing at which a received-light signal was received during scanning, and measures the X-direction deviation ΔX and Z-direction deviation ΔZ of the center position (tracking center) 34a of the prism 34 relative to a scanning center 38. The measured deviations ΔX and ΔZ are converted to the horizontal rotational quantity of the support portion 24 and the vertical rotational quantity of the lens barrel 26, respectively, which are in turn fed back to the horizontal rotation means 22 and vertical rotation means 27. In this way, the automatic tracking type total station 80 (FIG. 6) can be controlled so as to be aligned with the center 34a of the prism 34. The objective lens 32 and eyepiece 39 as a whole constitute a telescope. The operator can align the survey unit 80 with a target (prism 34) through the telescope. The survey unit 80 is equipped with a finished-height data drive mode and an automatic vertical (height-direction) tracking mode. These modes will be described later.

The total tracking station 80 has an incorporated central processing unit (CPU), which functions as part of the processing circuit (not shown). The incorporated CPU computes the horizontal coordinate position and height coordinate position of the target prism 34), based on the distance to the prism 34, horizontal angle, and vertical angle obtained by measurement. The computed horizontal coordinate position is displayed on the display portion 23 and also is output to an input-output port 40 (FIG. 4). The input-output port 40 is usually constituted by RS-232C and is connected to an external personal computer (PC) 41. The PC 41 transmits and receives data between it and the CPU of the total tacking station 80. In this embodiment, the PC 41 controls the operating mode of the total tracking station 80.

Figure 9:
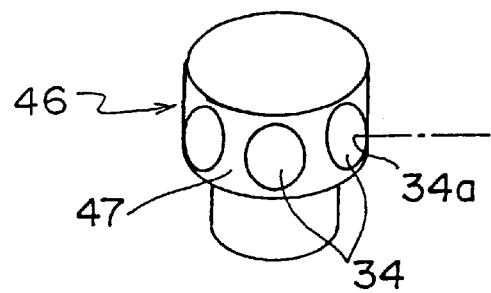
FIG. 9 is an enlarged perspective view showing a prism (target) shown in FIG. 6.

The pole 4, attached to the ground leveling implement 3, is provided with a light receiving unit 46 shown in FIG. 9.

The exterior circumferential portion 47 of the light receiving unit 46 is provided with a plurality of prisms 34 over the entire circumference at predetermined intervals. With this, the total tracking station 80 can track the bulldozer 1 even when the direction of the bulldozer 1 is changed by 360 degrees.

In the case of the laser beam scanning, the spread angle of the laser beam itself is narrow, so the energy density of the laser beam is high. Therefore, even when a target is far away from the survey unit 80, it can be tracked.

The operating procedure will hereinafter be described.

Figure 6:
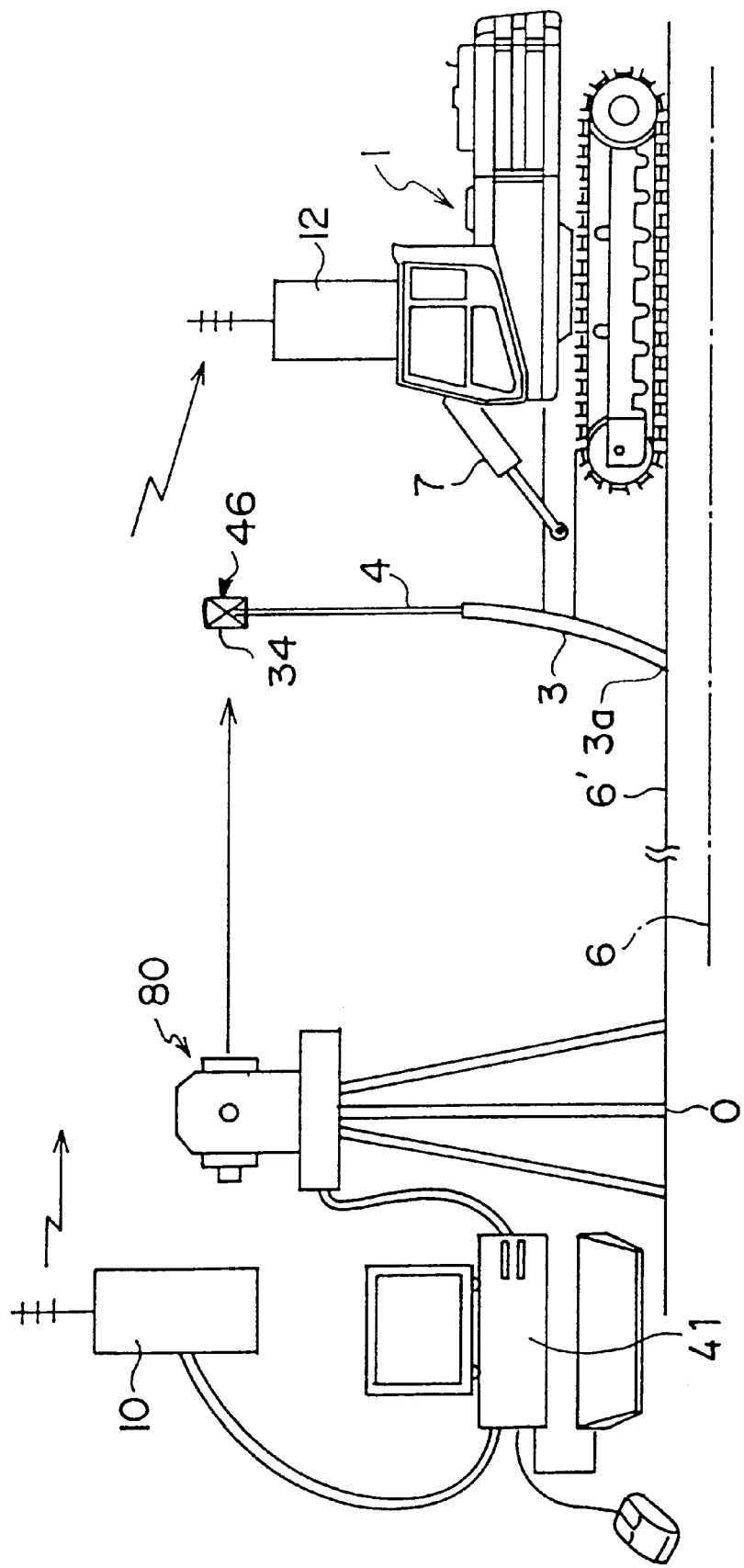
FIG. 6 is a side view used to explain an example of a ground leveling operation according to the present invention.

The prism 34 is installed on the ground leveling implement 3 of the construction machine 1 at a predetermined height from the lower edge 3a of the implement 3 by employing the pole 4 (FIG. 6). Next, the automatic total tracking station 80 is installed on a known coordinate point O at a dear place in the construction site. The automatic total tracking station is connected to the PC 41 in which the three-dimensional design data (finished-height data defined as a height of a finished surface corresponding to each horizontal coordinate position) of the construction site has been stored. The inputs to the PC 41 are the horizontal coordinate position of the known point of the automatic total tracking station 80, the machine height, and the target height from the lower edge 3a of the ground leveling implement 3 to the vertical center position 34a of the prism 34. The operation of the automatic total tracking station 80 is started toward the prism 34.

The automatic total tracking station 8 always tracks horizontal movement of the prism 34. The EDM portion 29 measures a distance to the prism 34 referenced to a known point. At this time, an up-and-down direction is not tracked. Consequently, there are cases where the position of the prism 34 is not on the distance measuring axis. In such cases, measurement of distance will be possible if the distance measuring light P1 of the EDM portion 29 has an appropriate spread.

The horizontal coordinates X and Y of the prism 34 are calculated from the angle data and distance data of the rotary encoder (not shown) of the automatic total tracking station 80 and are output to the PC 41.

Figure 14:
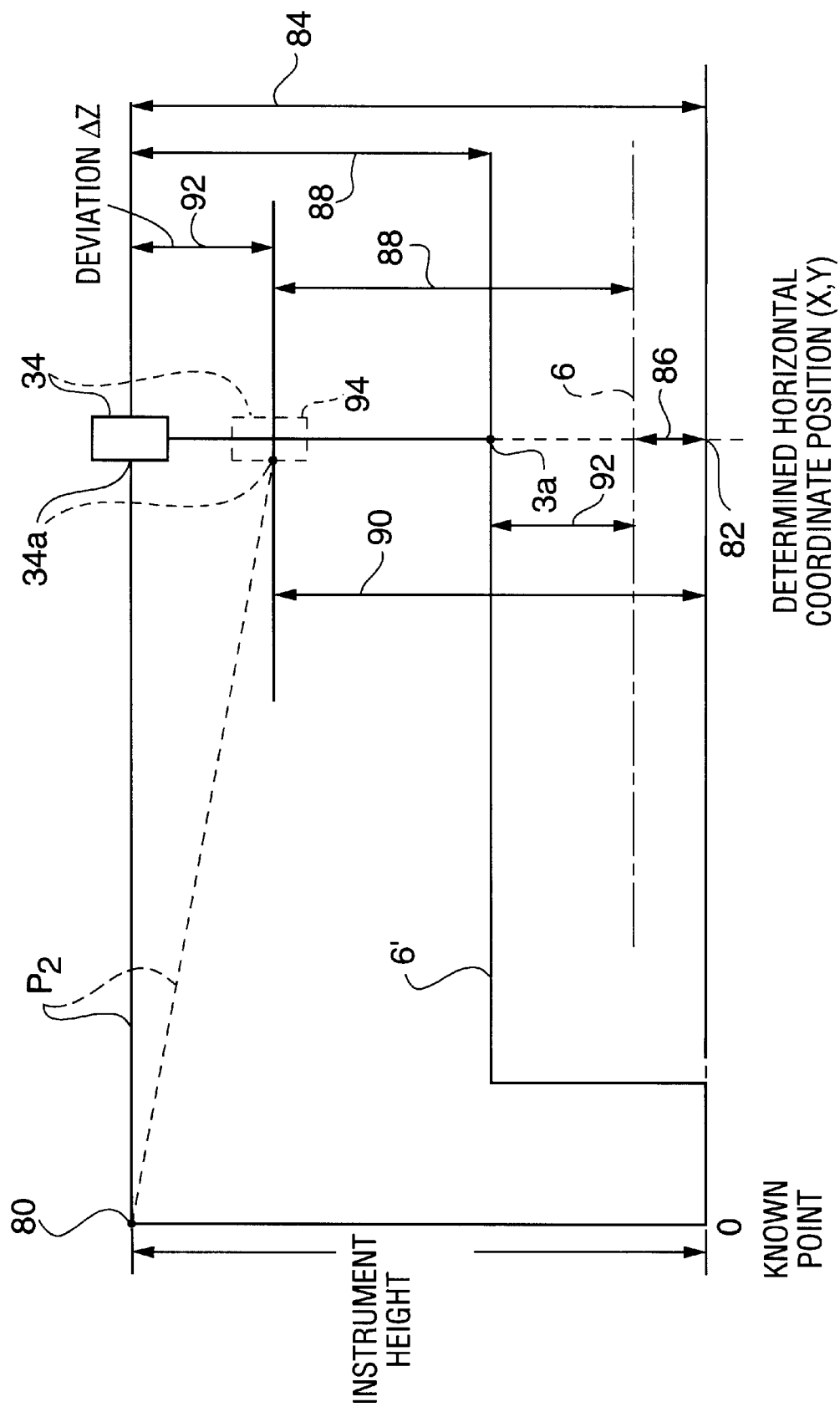
FIG. 14 is a side elevation view showing a mode of operation of the present invention.

The PC 41 compares the calculated coordinates X and Y with design data (finished-height data) and computes finished target height (height of a vertical center of the target 34 when the implement is not the finished height. As shown in FIG. 14, the survey unit measures the horizontal coordinate position 82 of the prism 34 and the measured target height 84. The finished-height data at the horizontal coordinate position 82 defines a finished height 86 of the finished ground level 6 relative to point O. The height 88 of the prism 34 above the bottom 3a of the implement is added to the finished height 86 to determine the finished target height 90. The difference between the measured target height 84 and the finished target height 90 is a deviation $\Delta Z$ 92. The deviation $\Delta Z$ is the amount of ground that has to be removed or filled to bring the existing ground surface 6' to the finished ground level 6 defined by the finished-height data.) at the horizontal coordinates. The PC 41 outputs an instruction to the rotation means 27 to adjust the height of the tracking light P2 of the automatic total tracking station 80 so that the height of the tracking light P2 at the horizontal coordinate position is the finished target height 90, as shown in dashed lines at point 94 in FIG. 14. The automatic total tracking station 80 rotates the lens barrel 26 in the vertical direction according to the instruction.

At the time the rotation of the lens barrel 26 ends, the PC 41 calculates the vertical deviation of the prism 34, i.e., the deviation $\Delta Z$ 92 (FIG. 14). The detected vertical deviation is output to a radio transmitter 10. At the same tine, this deviation data is output to the PC 41 as construction evaluation data. The PC 41 records the construction evaluation data on the memory thereof. The radio transmitter 10 outputs deviation data to a radio receiver 12. The radio receiver 12 outputs the deviation data to the drive control unit of the oil pressure control unit 7. The oil pressure control unit 7 controls the ground leveling implement 3 up and down according to the deviation data so that the desired height of the finished surface is graded.

In the control system according to the present invention, the aforementioned operation is repeated each time the automatic total tracking station 80 measures distance. In this way, ground 6' is cut or dug by the ground leveling implement 3 and is finished to an expected finished plane 6.

According to this mode of operation of the present invention, the automatic total tracking station 80 does not vertically track the target (prism 34) installed in the ground leveling implement 3 of the construction machine 1 because it vibrates and is controlled up and down. Instead the station 80 follows the design data (finished-height data) transmitted from the PC 41. Therefore, high precision construction becomes possible. In addition, the automatic total tracking station 80 always detects the vertical deviation $\Delta Z$ of the prism 34, and therefore, if the deviation is recorded and stored, it can be used as construction evaluation data.

In this embodiment, while the target has been scanned and tracked by the tracking light P2, the present invention is not limited to this. For example, a two-dimensional CCD sensor, a 4-split element, may be provided in the light receiving element 37 for performing a tracking operation. In such a case, the scanning-light generating portion 28 shown in FIG. 5 is replaced with a light source portion having a suitable spread angle. That is, a scanning mechanism is unnecessary.

Figure 10:
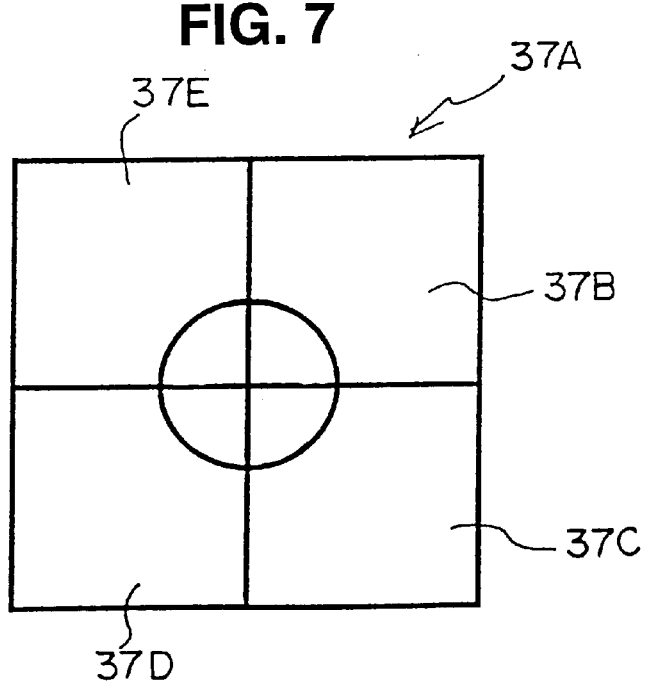
FIG. 10 is a plan view showing a 4-split element.

In the above case, the tracking light P2 emitted from the light source is radiated through the objective lens 32 to the prism 34 and is reflected by the prism 34. The reflected tracking light P2 passes through the objective lens 32 again and is focused and projected on the light receiving element 37. The projected image on the light receiving element 37 is detected and then is fed back to a servo system, thereby performing automatic tracking. FIG. 10 illustrates an alternative to the scanning mechanism which uses a 4-split element 37A employed as the light receiving element 37. The 4-split element 37A consists of four light receiving surfaces 37B through 37E, and the center thereof is disposed so as to be aligned with an optical axis. The tracking light P2, reflected by the prism 34 and projected on the light receiving surfaces 37B through 37E, generates four outputs proportional to the projected areas on the light receiving surfaces 37B through 37E. Therefore, from the four outputs of the light receiving surfaces 37B through 37E the displaced position of the tracking light P2 can be detected. According to this control system, the tracking light P2 from the survey unit 80 is not radiated toward the light receiving element 37, rather a light source for tracking is disposed near the prism 34. The image, formed by the light source for tracking, is received by the 4-split sensor 37A (two dimensional CCD) serving as the light receiving element 37 of the survey unit 80, and the deviation between the optical center axis and the position at which the image was received is received, thereby tracking a target.

In aforementioned control system, a beam scanning mechanism is not required and therefore the survey unit 80 becomes structurally simple, but tracking light with a certain degree of spread becomes necessary in order to reliably irradiate the prism 34 or automatic total tracking station 8 itself, so the trackable range will be limited.

Incidentally, in the construction prior to final finishing, high precision is not required and construction is repeated many times. With the repetition of the operation, a land creating operation is gradually performed as the design data (finished-height data) requires. That is, in an initial stage of construction, the road surface in the present condition is often considerably offset from a designed value. According to the aforementioned embodiment, a height of the tracking target 34 where it would be when the implement is at the finished surface 6 at a target horizontal coordinate position is always indicated by the tracking light P2. Therefore, when a ground level for rough finishing is considerably offset from a designed height and firmer than other ground levels, the prism 34 can depart from a tracking range so measurement of distance becomes impossible. In the case where a ground level for rough finishing is uniformly offset up or down from a finished surface height, the prism 34 can be kept within the tracking range by adding a predetermined offset to the finished surface height. However, in the case where land with a complicated configuration is leveled, a great number of prisms 34 must be arranged in an up-and-down direction or the spread angle of the distance measuring light P1 must be enlarged. Consequently, the control system becomes complicated and the cost is increased.

According to the following embodiment, when a ground level for rough finishing is considerably offset from a designed height, construction can be accurately performed without arranging a great number of prisms 34 in an up-and-down direction, even if the ground for rough finishing is partially firmer than the ground at other places.

The distance measuring light P1 of the EDM 29 usually has a spread angle of a few minutes. Therefore, if the prism 34 exists in this spread angle range, measurement of distance can be performed. For example, when the spread angle is 5 minutes and the prism 34 is 50 m off, the beam spread is about 7 cm. Therefore, if the deviation is within ±3.5 cm, measurement of distance can be performed. Therefore, if construction is performed within ±3.5 cm relative to a designed value with a single ground leveling operation, distance can be measured at all times and there will be no problem.

However, in the case where the present road surface condition is bad and, for example, there are many places offset from the designed data (finished-height data), or when ground is partially firm and therefore construction cannot be performed within ±3.5 cm with a single ground leveling operation, the tracking light P2 may not strike the prism 34 and therefore the light receiving element 37 will not be able to receive the tracking light P2.

Incidentally, the automatic total tracking station 80 always detects the vertical position of the prism 34. Therefore, the automatic total tracking station 80 can know how the present construction condition is offset from the design data (finished-height data).

Hence, the automatic total tracking station 80 is constituted so that if a ground leveling operation is beyond a predetermined range (for example, ±3 cm), vertical tracking as well as horizontal tracking is automatically started as in a standard automatic total tracking station.

More specifically, the automatic total tracking station 80 is switched from a finished-height data drive mode (described above) to an automatic vertical tracking mode when the aforementioned vertical deviation ΔZ of the prism 34 exceeds ±3 cm. The vertical rotation means 27 deflects the tracking light P2 so that it is positioned at the vertical center position 34a of the prism 34. In other words, the vertical rotation means 27 deflects the tracking light P2 so that the center of the optical axis of the lens-barrel portion 26 coincides with the vertical center position 34a of the target, thus tracking the target (prism 34).

Even in this case, the deviation data ΔZ (difference between a measured target height and a finished target height) transmitted from the automatic total tracking station is used as control data by the implement controller to control the height of the implement. The height deviation data is transmitted from the radio transmitter 10 to the radio receiver 12.

In the above case, although the automatic total tracking station 80 also performs vertical tracking and, therefore, precision is degraded, no hindrance will arise because this operation is originally performed when ground is considerably offset from the design data (finished-height data).

For ground with a considerable offset the design data (finished height data), the ground leveling operation is repeated by the aforementioned method. If the offset from the design data is within a constant range (for example, ±2 cm) in a succession, the automatic total tracking station 80 will stop the vertical tracking and will be switch to the finished-height data drive mode again.

In addition, if the vertical tracking servo response is reduced to such a degree as not to follow vibration of a heavy machine (construction machine) and fine deviation is corrected with the vertical deviation ΔZ (shown in FIGS. 8 and 14), precision will be enhanced.

In the foregoing description, the deviation data ΔZ has been transmitted or to the construction machine 1 by the radio transmitter 10 and the received by radio receiver 12. However, if optical communication means described hereinafter is employed, the deviation data ΔZ can be transferred to the construction machine 1 without being subjected to communication jamming and interference.

Figure 11:
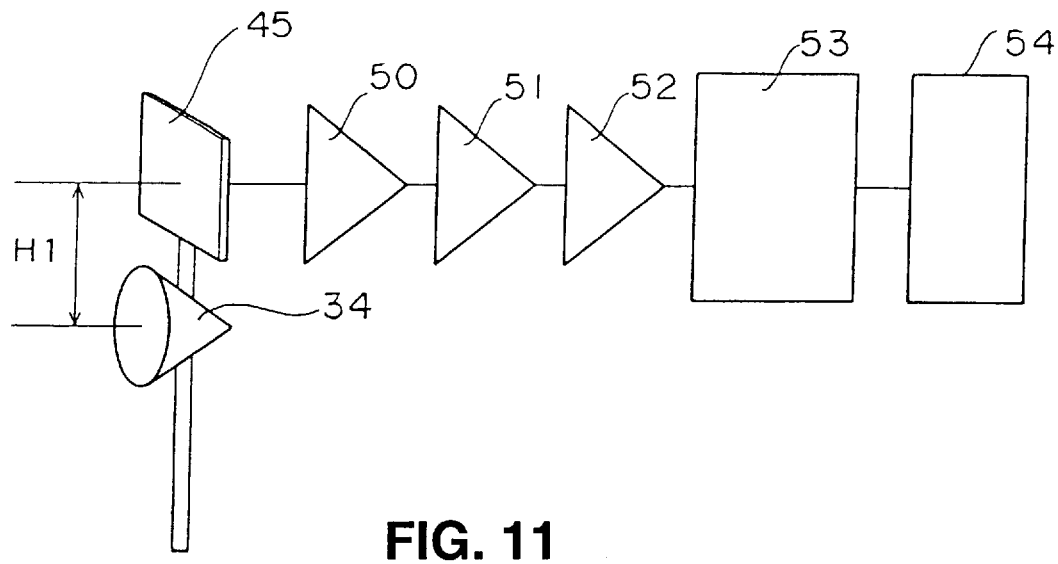
FIG. 11 is a block diagram showing a demodulation circuit.

That is, in this further alternative embodiment, the deviation data ΔZ) is modulated to the tracking light P2 and sent, and the tracking light P2 is demodulated by a light receiving element 45 shown in FIG. 11, thereby taking out finished-height data.

In the case where two-dimensional raster scanning is performed as shown in FIG. 8, if it is assumed that horizontal scanning time for one line is 0.1 msec and the number of vertical scan lines is 100, it will take 10 msec to complete the scanning operation. After completion of the scanning operation, the tracking light P2 is returned to the center position 38 of the target and then modulation for data communication is performed.

The light receiving signal is processed by a subsequent electric circuit. In the case where the light receiving element 45 is disposed above the prism 34, preferably the scanning beam P2 from the automatic total tracking station 80 is not returned to the target center position 38 but is returned to the light receiving element 45 slightly above the target center position 38, in order to accurately perform reception. How the scanning beam P2 is deflected upward from the target center can be easily calculated, because the offset value H1 between the prism 34 and the light receiving element 45 is known and also the distance to the prism 34 has been measured by the automatic total tracking station 80 itself. In this embodiment, vertical tracking is not performed but is controlled by design data (finished height data). Therefore, the position of the prism 84 fixed to the pole 4 and the position of the light receiving element 45 are not always the same position relative to a collimated axis. Even in this case, when a scanning operation for tracking is performed, it can be judged how the prism 34 is displaced from a collimated axis. Therefore, it will be sufficient if the scanning beam P2 is deflected to the displaced direction.

Figure 12A:
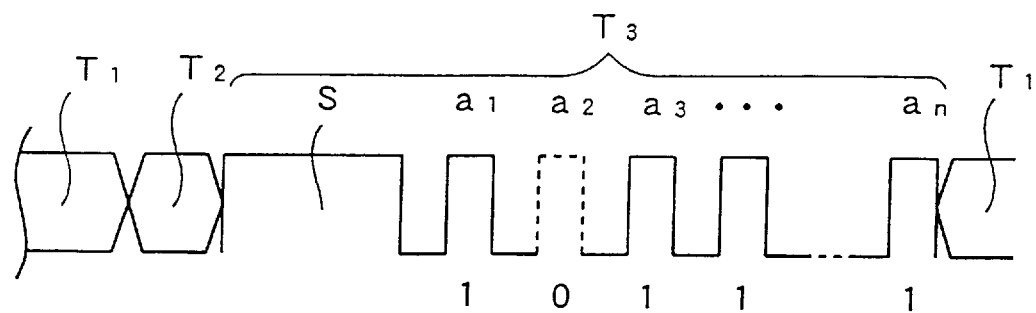
FIG. 12a is a diagram showing modulated tracking light.
Figure 12B:
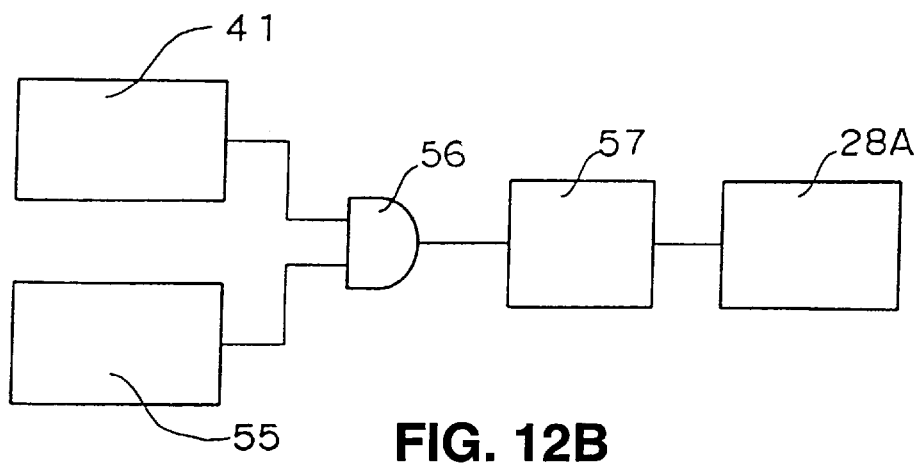
FIG. 12b is a block diagram showing a modulation circuit.

FIGS. 12(a) and 12(b) show an example of data modulation performed by a tracking light scanning method. FIG. 12a shows a signal modulated by an ASK method. In FIG. 12a, T1 represents an interval during which the position of the prism 34 is detected by performing a raster scanning operation for tracking. T2 represents an interval during which the scanning beam P2 is deflected to the light receiving element 45. T3 represents an interval during which data communication is performed.

In the period T3 of FIG. 12a, reference character S denotes a synchronous pattern representing the start of blocks of data, and a1, a2, a3, . . . represent serial data bits, respectively. The data bits are partitioned by data bit 0 having the same width so that data bit 1 does not continue in succession. In this example, in order to easily detect the synchronous pattern S, the width is a few times greater than each width of data bits a1, a2, a3, . . . . The data bits following the synchronous pattern S indicate binary data (for example, 1, 0, 1, . . . ).

FIG. 12b shows a modulation circuit. In the figure, reference numeral 55 denotes an oscillator and 56 a gate circuit. The oscillator 55 outputs a carrier wave, and the gate circuit 56 performs ASK modulation on the serial data transmitted from the PC 41. A drive circuit 57 causes the laser diode 28A to emit light, while modulating the laser diode, based on serial data. The tracking light P2 is data-modulated with the deviation data ΔZ. The deviation data ΔZ thus is sent to the light receiving element 45. In this way, deviation data is transmitted to the light receiving element 45. In this embodiment, the width of the synchronous pattern S is 1 msec, the width of each data bit is 0.1 msec, and the partition width is 0.1 msec. The tie required for data communication of 10 data bits is 3 msec. On the other hand, since the raster scanning time for a tracking operation is 10 msec, the time during transmission does not become a problem.

Although the tracking light P2 is incident upon the light receiving element 45 during a raster scanning operation, this does not hinder detection of the synchronous pattern S, because the tracking light is not incident in succession compared with the synchronous pattern S. Also, the distance measuring light P1 of the EDM portion 29 is likewise incident upon the light receiving element 45. In this case, if a carrier wave frequency different from the modulation frequency (usually 15 Mhz and 75 Mhz) of the EDM portion 29, for example, 500 khz is employed as a frequency for data modulation, frequencies can be discriminated from each other by a filter circuit (not shown).

The light, received by the light receiving element 45, is amplified to an appropriate level by an amplifier 50, as shown in FIG. 11. Then, the carrier wave is removed by an envelope detector 51 and is shaped by a waveform shaping circuit 52. The shaped light is input to a computer 53. The computer 53 detects the synchronous pattern S in which data bits 1's continue at more than a constant interval, and from the timing at which the detected synchronous pattern S rises, it is judged whether the input signal, input for every constant interval, is a 0 or a 1. With this, data is demodulated. After demodulation, the computer 53 outputs the demodulated data to a display 54 or an output connector (not shown).

A description will next be made of the case where the 4-split element 37A is used.

Figure 13:
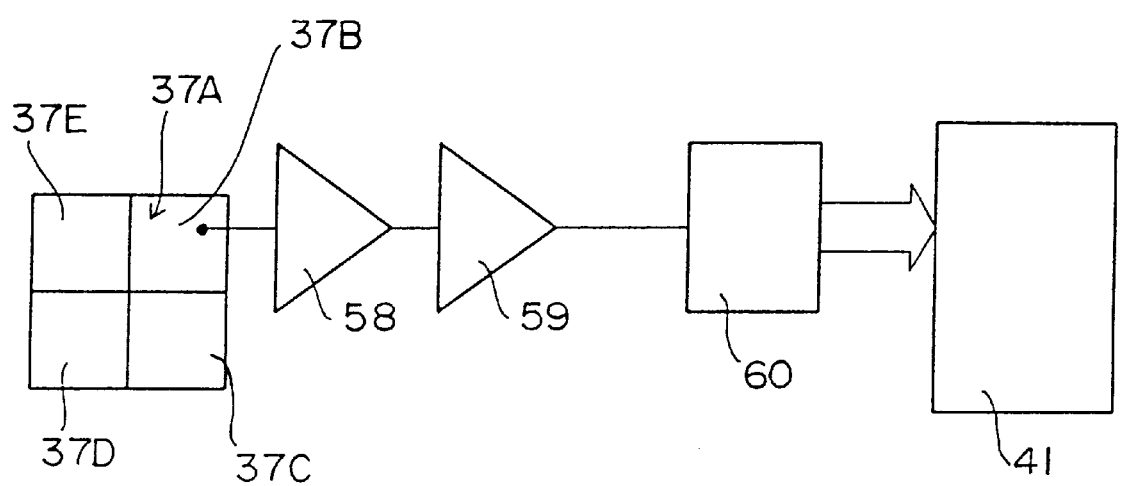
FIG. 13 is a block diagram showing how the received position of the tracking light is detected by the 4-split element.

In the case where the 4-split element 37A is used as the light receiving element 37, tracking and communication do not need to be performed in a time-division manner, because the tracking light P2 is always radiated on the prism 34 and the light receiving element 37. In this case, since the data-modulated tracking light P2 is reflected by the prism 34 and returns, data is not detected but the synchronous pattern S emitted stably is detected when light is received by the 4-split element 37A. Based on the signal level of the detected synchronous pattern S, the received position of the tracking light P2 is detected For example, as shown in FIG. 13, the output of the light receiving surface 37b of the 4-split element 37A is amplified to an appropriate level by an amplifier 58. After amplification the carrier wave is removed by an envelope detector 59, the tracking beam P2 is shaped by a waveform shaping circuit 60 and is sent to the PC 41. The PC 41 detects the synchronous pattern S where data bits 1's continue more than a constant interval. The output of an A/D converter (not shown) at that time is fetched. Likewise, the light receiving surfaces 37C through 37E are processed with similar circuits. From the A/D conversion output values of the light receiving surfaces 37B through 37E, the received position of the tracking beam P2 is computed and then is fed back to a servo system. In this embodiment, the survey unit 80 can track the target while transmitting data.

As previously described, optical communication becomes possible by carrying data with the tracking light and installing a light receiving element near the prism 34 (target), and consequently, a radio communication unit is not required. In the aforementioned embodiments, although ASK modulation and demodulation have been employed, other known methods may be employed. For example, a PSK method may be utilized as a modulation method.

While the present invention has been described with reference to preferred embodiments thereof, the invention is not to be limited to the details given herein, but may be modified within the scope of the appended claims.

What is claimed is:

1. An automatic control system comprising:

a construction machine having a ground leveling implement and a light-reflecting target coupled to the implement, wherein the construction machine also has reception means for receiving deviation data and implement control means for controlling the height of said implement according to the received deviation data;

a survey unit including means for measuring a coordinate position and a height of said target by projecting a beam of light toward said target and receiving light reflected from said target;

storage means coupled to the survey unit for storing finished-height data corresponding to coordinate positions, wherein the finished-height data defines a desired finished height of the ground at the coordinate positions;

computation means coupled to the survey unit for determining from the finished-height data a finished target height at the coordinate position of said target, wherein the finished target height is the height of the target when the implement is at the desired finished height of the ground at the coordinate position of said target, and wherein the computation means further includes means for determining a deviation between the finished target height and the measured target height measured by the survey unit; and transmission means coupled to the computation means for transmitting said deviation to the reception means on the construction machine;

wherein said survey unit includes means for operating in a finished-height data drive mode by moving the light beam vertically so that the height of the light beam at the coordinate position of said target is at the finished target height.

2. The automatic control system as set forth in claim 1, wherein said transmission means modulates said light beam and transmits data of said deviation to said reception means.

3. The automatic control system as set forth in claim 1 wherein said transmission means is a radio transmitter and said reception means is a radio receiver.

4. The automatic control system as set forth in claim 1, wherein:

said survey unit includes means for operating in an automatic vertical tracking mode by moving the light beam to track the center of said target; and wherein said survey unit operates in said automatic vertical tracking mode when said deviation is greater than a predetermined value, and said survey unit operates in said finished-height data drive mode when said deviation is less than the predetermined value.

5. The automatic control system as set forth in claim 1, wherein said target is provided integrally in said ground leveling implement and wherein the heights of said ground leveling implement and said target are controlled by said implement control means.

6. The automatic control system as set forth in claim 1, wherein when data on the coordinate position of said target is input from said survey unit to said computation means, said computation means controls a rotation means in the survey unit to move the light beam to the finished target height at the measured coordinate position.

7. The automatic control system as set forth in claim 1, wherein said deviation is stored and employed as construction evaluation information.

8. The automatic control system as set forth in claim 1, wherein said survey unit includes means for measuring a distance from a position thereof to said target.

9. The automatic control system as set forth in claim 1 wherein the light beam includes a distance-measuring light beam having one wavelength and a tracking light beam having a different wavelength.

10. The automatic control system as set forth in claim 9 wherein said means for measuring the height of the target includes means for raster scanning the tracking light beam in an area surrounding the target and for sensing a vertical deviation of the tracking light beam reflected from the target.

11. The automatic control system as set forth in claim 9, wherein said means for measuring the height of the target includes a two-dimensional CCD sensor and means for imaging the tracking light beam reflected from the target onto on the CCD sensor.

12. The automatic control system as set forth in claim 11 wherein the CCD sensor is split horizontally and vertically into four elements.

13. The automatic control system as set forth in claim 2 wherein said reception means includes a light-sensitive sensor separate from and mounted adjacent to the light-reflecting target.

* * * * *